Feb. 10, 1970  R. J. CHAUDOIR  3,494,278
AUTOMATIC TOASTER WITH REPLACEABLE FOOD-CARRYING BASKETS
Filed April 18, 1968  2 Sheets-Sheet 1

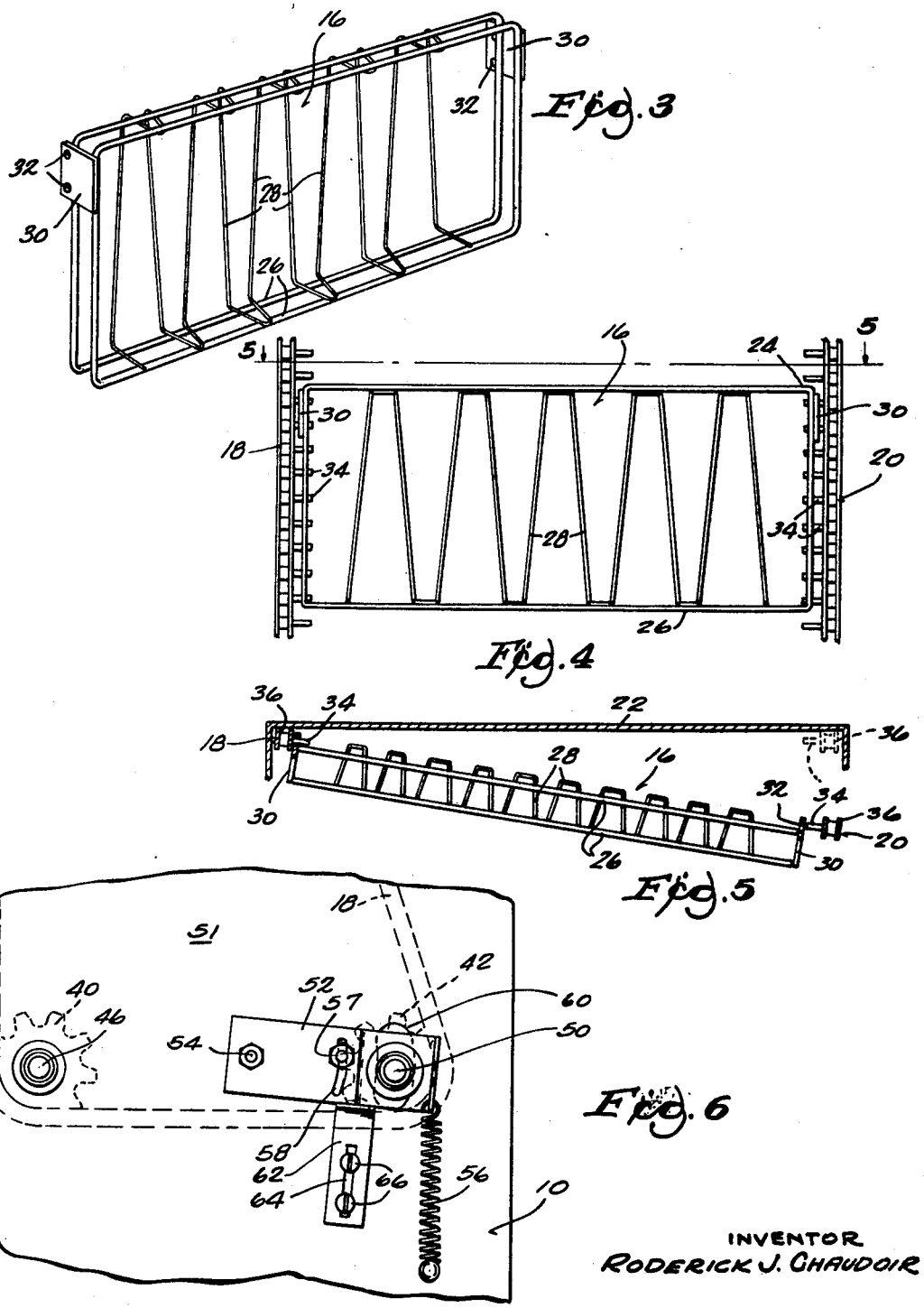

INVENTOR
RODERICK J. CHAUDOIR

BY Wheeler, Wheeler, House & Clemency
ATTORNEYS

United States Patent Office 3,494,278
Patented Feb. 10, 1970

3,494,278
AUTOMATIC TOASTER WITH REPLACEABLE FOOD-CARRYING BASKETS
Roderick J. Chaudoir, Milwaukee, Wis., assignor to Hatco Corporation, Milwaukee, Wis., a corporation of Wisconsin
Filed Apr. 18, 1968, Ser. No. 722,478
Int. Cl. A47j 37/04, 37/08
U.S. Cl. 99—386                              6 Claims

ABSTRACT OF THE DISCLOSURE

A conveyor for baskets carrying food products to be heated comprises separate chains confined in a closely fitted cabinet. Individual chain tighteners subject to spring bias assuring proper tracking have adjustable stops which limit chain tension to a predetermined value required to hold each flight to a retcilinear path without requiring guides. The basket and respective chain links have interfitted pin and socket means releasable by relative lateral movement which is possible by pulling one of the chains outwardly to provide additional clearance between it and its companion chain to permit basket mounting and dismounting.

Background of invention

This application is a companion to an application of Kenneth Hatch 598,339, filed Dec. 1, 1966 and entitled "Automatic Toaster," now Patent 3,400,651, issued Oct. 10, 1968. In toasters of this general type, it has been conventional to provide positive means for adjustment of conveyor chain tension. This is not entirely satisfactory because chain tension varies materially according to expansion and contraction resulting from the very marked differences in temperature experienced in an intermittently operable device of this kind. Tracking has been a problem, particularly in chains in which slack is necessary to permit chain movement laterally for basket removal.

With chains of this general type, considerable initial tension is necessary to assure tracking, uniformity of heating depending on maintaining a fixed distance between the food and the heaters. Yet when the chain tension is fixed at a value sufficient to assure rectilinear operation of the food carrying baskets, the tension may become excessive when cold, or may be inadequate when the chains have been heated long enough to have substantial expansion. In some cases, the basket has even fallen from its supporting pin.

In the instant device, the chain tighteners are subject to spring bias sufficient to maintain the desired chain tension at all times. Yet the bias on the chains is prevented from becoming excessive by the use of fixed stops which are adjustable to limit the bias.

In previous devices, the chains had to have considerable clearance to permit lateral displacement of a chain in order that the pin and socket mounting of the respective baskets could be manipulated laterally to remove or replace the baskets. The instant structure uses pin and socket mountings for the baskets but is arranged to permit of replacement by drawing one of the chaine outwardly toward or through the front of the cabinet until the distance between chains has been increased sufficiently to permit the pins to be disengaged from their respective sockets. By virtue of this arrangement, the cabinet can be made more compact. This mode of basket replacement is, in turn, made possible by the use of chain tighteners of the type above described which are subject to substantial spring bias but are limited as to bias applied individually to the respective chains.

Summary of invention

While the device disclosed is primarily a toaster, it may be used for heating materials other than bread.

Chain tighteners of special design used preferably on both of the chains which support the baskets provide chain tension which is always adequate but cannot be excessive because of the adjustable tension-limiting stops. This tension not only holds the chains taut under all temperature conditions to maintain tracking and uniformity of toasting but it also permits an intermediate portion of an individual chain to be pulled outwardly at the open front of the housing until the lateral distance between it and the companion chain is sufficient so that the basket can be moved laterally with respect to its pin and socket mounting on the respective chains.

Brief description of drawings

FIG. 3 is a view in perspective showing one of the food carrying baskets.

FIG. 4 is an enlarged detail view in front elevation showing the mounting of the food carrying basket upon the respective conveyor chains.

FIG. 5 is a view taken in section on the line 5—5 of FIG. 4 showing one of the chains pulled forwardly from its normal plane of operation to permit of the removal or insertion of a basket.

FIG. 6 is a fragmentary detail view in elevation showing a detail of the chain tensioning device.

Description of preferred embodiment

Figures 1, 2:
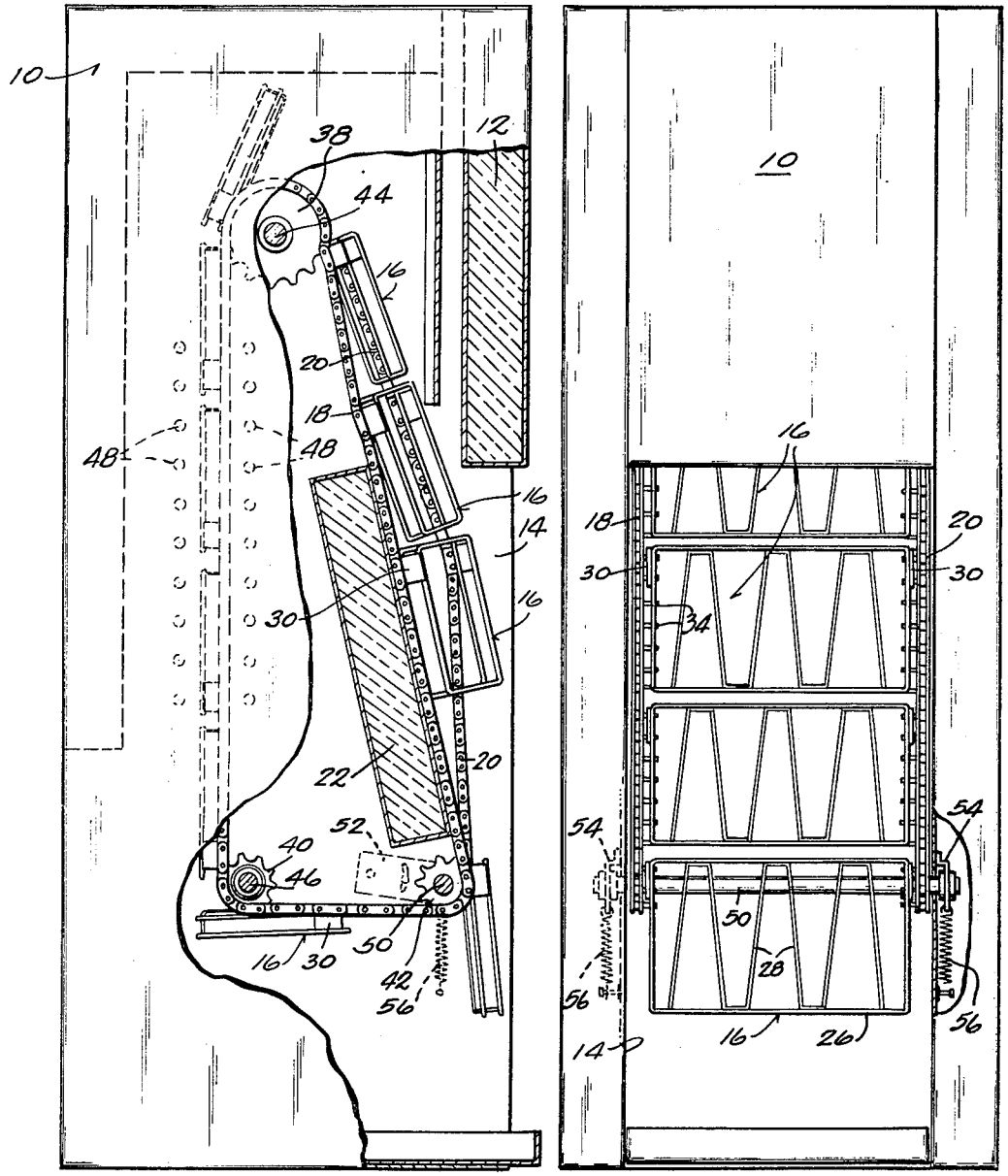
FIG. 1 is a view in side elevation of a device embodying the invention, portions of the side wall of the casing being broken away.
FIG. 2 is a view of the device in front elevation.

The cabinet 10 has an insulated front wall 12 with a large opening at 14 through which food may be inserted into the several baskets 16. The opening 14 is sufficiently large to permit the baskets to be removed readily from their supporting chains 18 and 20 for cleaning or repair. A panel of insulation at 22 intercepts radiant heat which would otherwise emerge from the opening 14 to the discomfort of the operator.

Disengageable pin and socket means are used to mount leading end portions 24 of each basket 16 on the respective chains. As clearly illustrated in FIGS. 3, 4 and 5, the basket 16 is a skeletonized device comprising generally rectangular wire frames 26 connected by cross wires 28 against which the food rests in the toasting operation. At the ends of the basket are small plates 30 each of which has two socket openings 32 to receive pins 34 with which the several chain links 36 are provided. The plates project slightly beyond the adjacent frame 26 as best shown in FIGS. 3 and 5 so that the pin and socket connection is made outside of the back plane of the basket proper. This permits the basket to be connected with the chain only adjacent the leading end of the basket, remaining portions of the basket resting against the several pins 34 as shown in FIG. 4.

Each of the respective conveyor chains 20 operates about a sprocket 38 at the top of the cabinet, a sprocket 40 at the rear of the cabinet and a sprocket 42 at the front of the cabinet adjacent opening 14. The sprockets 38 and 40 are respectively mounted on cross shafts 44 and 46, their locations being fixed to guide the chains with accuracy where they pass between the heating elements shown in dotted lines at 48 in FIG. 1.

The sprocket 42 at each side of the machine is carried by a shaft 50 on a carrier movable in a chain tension adjusting direction. For example, the shaft may be at the free end of a lever 52 pivoted at 54 and subject to the bias of a spring 56 acting in said direction as best shown in FIG. 6. A guide bolt 57 is preferably provided, the lever 12 having an arcuate slot 58 through which the bolt 57 projects. The carrier is desirably located on the outside of the conveyor path, there being an arcuate opening 60 in the adjacent partition 51 for the shaft 50 upon which sprocket 42 is rotatably mounted.

The spring 56 has to be strong enough to maintain the desired conveyor chain tension under all temperature conditions. To prevent this tension from pulling the chain too far, each of the chain tighteners is provided with an adjustable stop 62 having a slot 64 for bolts 66 which fix the position of the stop to limit chain position to the desired value.

As shown in FIG. 2, the opening 14 in the cabinet does not greatly exceed the over-all width of the conveyor. The pin and socket connection between the respective toaster baskets and their respective chains requires relative lateral movement for engagement and disengagement of the pins in the sockets. To accommodate such movement, notwithstanding the close fit of the chains in the cabinet, it is possible to pull a portion of one of the chains forwardly as shown at the right in FIG. 5 so that the links 36 which carry the pins are offset forwardly when the basket is moved to its illustrated full line position from its normal dotted line position. This increases the distance between the pins so far that the socket 32 in the plates 30 at the end of the basket as viewed in FIG. 5 has become completely disengaged from the pin 34 of the adjacent link 36. The basket may now be withdrawn through the opening 14, disengaging itself from its pin and socket connection with the opposite conveyor chain. The chain tightening spring 56 permits of this relative displacement without affecting normal operation as above described. It is obviously immaterial whether the pins or the sockets are on the conveyor links. The arrangement disclosed is preferred because the basket, when removed from the conveyors, has no projecting pins and may be handled more readily for cleaning or replacement.

Replacement is made by following the above steps in converse order.

I claim:

1. In a device of a type in which laterally spaced conveyor chains carry food-supporting baskets past a source of heat, the improvement which consists in the combination of such chains and upper and lower sprockets over which the chains are trained for operation in substantially parallel planes, of chain tighteners individual to the respective chains and each of which includes a shaft upon which one of the sprockets is mounted, a carrier upon which the shaft is movable in a direction to vary the tension on its respective chain, a tension-increasing spring acting on the carrier in said direction, and an adjustable stop in the path of movement of the carrier in said direction for limiting chain tension.

2. A device according to claim 1 in which the carrier comprises a lever having a pivot and a free end portion upon which the shaft is mounted.

3. In a device of a type in which laterally spaced conveyor chains carry food-supporting baskets past a source of heat, the improvement which consists in the combination of such chains and upper and lower sprockets over which the chains are trained for operation in substantially parallel planes, of chain tighteners individual to the respective chains and each of which includes a shaft upon which one of the sprockets is mounted, a carrier upon which the shaft is movable in a direction to vary the tension on its respective chain, a tension-increasing spring acting on the carrier in said direction, a series of said baskets, laterally engageable and disengageable pin and socket means on the ends of each basket and portions of the adjacent chains for mounting and dismounting the basket with respect to the chains upon relative lateral displacement between the baskets and at least one of the chains, the chain tightener for said one chain permitting movement of said one chain in its respective plane and forwardly with respect to the other chain to an extent sufficient to increase the spacing between said chains for accommodating said mounting and dismounting.

4. A device according to claim 3 including a cabinet having means between which portions of the chains are laterally inaccessible, the cabinet having an opening at its front with side margins adjacent said planes and having heating elements rearwardly of said opening for the radiant heating of material carried by respective baskets, manipulation of said one chain forwardly at said opening changing the angularity of a basket engaged therewith whereby to increase the distance between said chains while leaving said chains in their respective planes, the pin and socket means of respective chains and said basket being thereupon engageable and disengageable in a direction lateral with respect to chain movement and constituting means for the withdrawal and placement of baskets when one chain is manipulated toward said cabinet opening.

5. A device comprising the combination with a cabinet having spaced sides and a front opening, of laterally spaced upper sprockets near the top of the cabinet, laterally spaced lower sprockets below the sprockets first mentioned, laterally spaced third sprockets at each side of the cabinet near said sides and adjacent the front opening, conveyor chains trained over the respective sprockets for movement in substantially parallel planes, heating elements behind and in front of a path between the upper and lower sprockets about which the chains are trained, carriers for the respective third sprockets which are movable downwardly in a chain tightening direction, each of said carriers including shaft means upon which the respective third sprocket is mounted, spring means acting downwardly upon both carriers in a chain tightening direction, stops adjustable in the path of movement of said carriers in a chain tightening direction and adapted to limit tension on the respective chains, baskets mounted upon the respective chains, said baskets and adjacent portions of said chains having laterally separable pin and socket means respectively disposed at the leading ends of the respective baskets, at least one of said chains being subject to manipulation in its respective plane forwardly toward said opening between the third sprocket and the upper sprocket over which said one chain is trained, such forward manipulation increasing the spacing between said one chain and the other chain of said conveyor sufficiently to permit lateral separation of the pin and socket means by which a basket is connected with the respective chains, thereby permitting the withdrawal and replacement of baskets.

6. A device according to claim 5 in which the cabinet has means closely fitted to the conveyor at opposite sides of said front opening and whereby said planes of conveyor chain movement are defined, said last means precluding lateral separation of the conveyor chains at the opening, whereby the forward movement of one of said chains in its plane of movement is required to permit the aforesaid lateral separation of the pin and socket means for withdrawal or replacement of a basket.

References Cited

UNITED STATES PATENTS

| 1,352,869 | 9/1920 | Boker | 74—242.15 |
| 2,028,944 | 1/1936 | Morrison | 99—386 |
| 2,257,758 | 10/1941 | Murch | 198—208 |
| 2,533,080 | 12/1950 | Alexander. | |
| 2,867,163 | 1/1959 | Bloom | 99—386 |

BILLY J. WILHITE, Primary Examiner

U.S. Cl. X.R.

74—242.15, 242.11; 99—391, 427, 443